United States Patent [19]

Morimoto et al.

[11] Patent Number: 5,038,839
[45] Date of Patent: Aug. 13, 1991

[54] FILLING APPARATUS

[75] Inventors: Shuji Morimoto; Haruhiko Yoshida, both of Osaka; Masakazu Oi, Toyonaka; Jotaro Kishimoto, Nishinomiya; Seiji Ohtani, Ibaraki, all of Japan

[73] Assignee: Takeda Chemical Industries, Ltd., Osaka, Japan

[21] Appl. No.: 380,599

[22] Filed: Jul. 17, 1989

[30] Foreign Application Priority Data

| Jul. 18, 1988 | [JP] | Japan | 63-178537 |
| Aug. 12, 1988 | [JP] | Japan | 63-202498 |
| Aug. 12, 1988 | [JP] | Japan | 63-202499 |
| Aug. 12, 1988 | [JP] | Japan | 63-202500 |

[51] Int. Cl.⁵ ............... B65B 1/32; B65B 3/28; G01G 13/00
[52] U.S. Cl. ................... 141/83; 141/128; 141/103
[58] Field of Search ............... 141/83, 103, 128, 129, 141/165, 178, 179; 198/468.2

[56] References Cited

U.S. PATENT DOCUMENTS

| 3,007,048 | 10/1961 | Knapp et al. | 141/83 |
| 4,197,046 | 4/1980 | Shank | 198/468.2 |
| 4,628,974 | 12/1986 | Meyer | 141/103 |
| 4,696,329 | 9/1987 | Izzi | 141/83 |
| 4,805,673 | 2/1984 | Wohrle et al. | 141/128 |

FOREIGN PATENT DOCUMENTS

| 0343130 | 5/1989 | European Pat. Off. | 141/83 |
| 3708078 | 9/1988 | Fed. Rep. of Germany | 141/83 |
| 3822087 | 4/1989 | Fed. Rep. of Germany | 141/83 |
| 910824 | 11/1962 | United Kingdom | 141/83 |

Primary Examiner—Ernest G. Cusick
Attorney, Agent, or Firm—Wenderoth, Lind & Ponack

[57] ABSTRACT

A filling machine provided with a filling amount weighing apparatus which is used in a step of preparing medical supplies and so on, and continuously fills automatically powder, liquid or the like of a very small amount into a container such as vial, ampul or the like so as to weigh the filling amount, on the employment of an electronic balance to effect a weighing operation of high speed and precision so as to improve the filling amount accuracy through the reduction in dispersion in the filling amount.

11 Claims, 10 Drawing Sheets

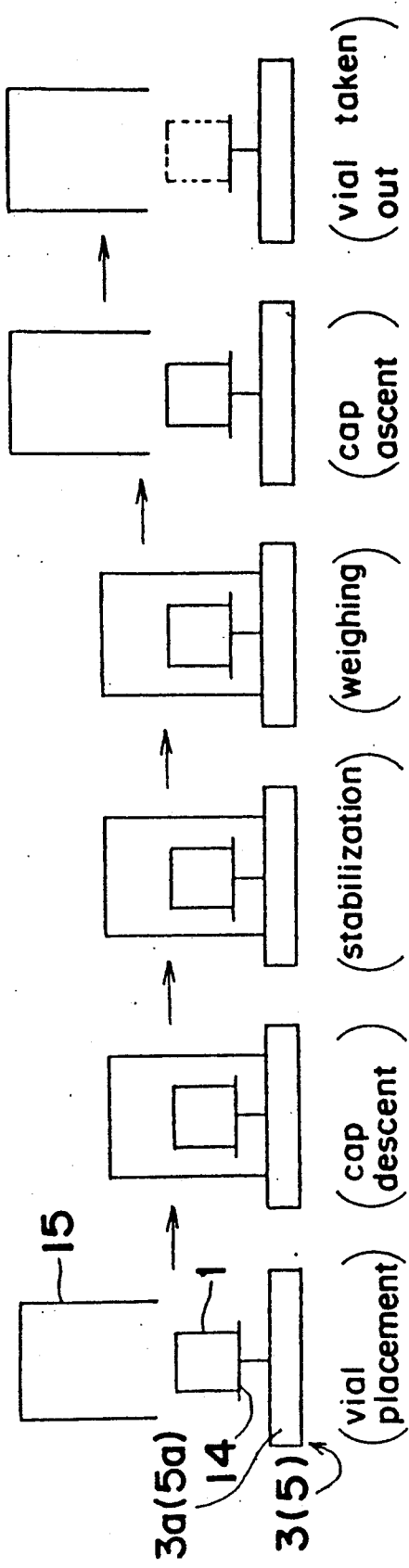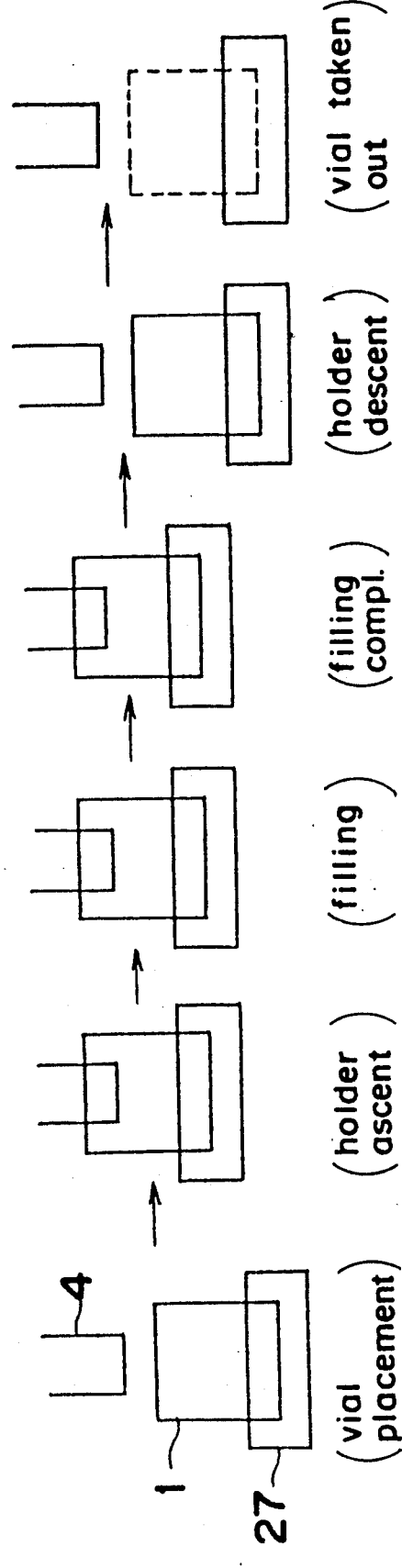

FILLING APPARATUS

BACKGROUND OF THE INVENTION

The present invention generally relates to a filling apparatus provided with a filling amount weighing apparatus, and more particularly, to an apparatus which is used in a process of preparing medical supplies and so on, and continuously automatically fills powder, liquid or the like of a very small amount such as 50 mg, 100 mg, 500 mg, 1,000 mg or the like into a container such as a vial, ampoule or the like so as to weigh the filling amount and also automatically controls a filling machine. The present invention uses an electronic balance as the weighing apparatus to effect a weighing operation at high speed and precision so as to improve the filling amount accuracy through a reduction in variation in the filling amount. The filling machine is controlled through the feedback-control of the weighing value to effect quantitative control of the filling amount. Furthermore, the apparatus is provided with means for effecting an emergency stop when clogging occurs.

Conventionally, in a process of filling medicine of this kind, the inspection of the filling amount is executed generally by methods (1) and (2) described hereinafter.

(1) A container filled with powder, liquid or the like is manually taken out of the conveying line so as to weigh it on a balance disposed at an off-line position. Thereafter, the contents (powder or the like) are discharged and the empty container is weighed and the filling amount is calculated by substraction.

(2) When an automatic discharged weighing apparatus has been disposed on the production line, an empty container which is not filled is drawn out properly for the weighing operation. After the filling operation, it is drawn out again for the weighing operation. The filling amount is calculated by subtraction.

When there is a difference between the calculated filling amount and the target amount in either of the above-described methods (1) and (2), a proper adjustment of the filling amount is executed.

Generally, in the powder filling system, the filling amount varies due to changes in the hopper level (stock amount) of the bulk material, specific volume, properties of the material and so on. Also, in the filling of liquid (including a suspension agent) or the like, the filling amount varies due to changes in viscosity, clogging of the needle point filter, looseness of the cylinders or the like. Thus, it is necessary to check the above-described filling amount at proper frequencies and to adjust the filling amount. However, in the filling process, abnormal changes in the filling amount may be caused because of unexpected problems in addition to the above-described normally expected changes. The conventional proper sampling inspections cannot check the abnormal filling amount due to unexpected trouble. When handling medicine, the conventional sampling weighing operation cannot cope with variations in filling amount because the accuracy of the filling amount must remain extremely high and also, defective products must not be produced under any circumstances.

Although weighing operations for weighing the respective filling amount for all the containers may overcome the above-described problem, the weighing operations for all the containers are hard to effect in the conventional weighing apparatus, because productivity is extremely reduced due to the weighing speed being slower than the filling speed.

Also, in order to weigh a very small amount by the use of an electronic balance, conventionally there is a method of obtaining a weighing value (a balance reference stability detecting method) through an averaging operation with a constant time averaged, conventionally in a stable output mode with a constant number of data being included within the tolerance width, a method of effecting a sampling operation after the passage of a set period of time, and other methods.

The method of obtaining the weighing value by the above-described stable output mode has a disadvantage in that generally too much time is taken to effect the high-speed weighing operation when high accuracy is required. If the tolerance width is widened to shorten the time, the accuracy becomes worse. In a method of effecting a sampling operation after the passage of the given period of time, the accuracy becomes worse if the established time is shortened. Also, more time is taken if the established time is lengthened to improve accuracy, and unexpected inferior data may be included because of noise, vibrations and so on.

Furthermore, when a measurement of extremely high accuracy such as approximately 1 mg or lower is effected, magnetic force lines or the like caused by temperature changes, the controller and the like, have a negative influence upon the measurement accuracy. Especially, the negative influence caused by static electricity cannot be avoided even if an electronic balance is provided in an evacuated enclosure such as is used conventionally, thus reducing the measurement accuracy of the electronic balance.

In this type of powder filling apparatus, when the filling into a certain number of sequential containers is continuously effected by the driving of the filling machine after a given amount of material is supplied into the hopper of the filling machine, the tendency of the filling amount to fluctuate is great in addition to the variation of the filling amount in the initial mode at the start of the operation of the filling machine. Also, even in the final mode when the amount of material in the hopper becomes smaller, the tendency of the filling amount to fluctuate becomes great. Although the least variation in the filling amount occurs in a steady operating state between the initial mode and the final mode, there is a tendency for the filling amount to fluctuate in a gradually increasing or decreasing manner. The above-described characteristics of the variation and the fluctuating tendency of the filling amount occur in accordance with the duration of the operation of the filling machine. Although the control is good when the filling amount is stable in a case where feedback control operation is effected based on the average value of a few filling amount data during an all container weighing operation, even if a uniform feedback control is effected from starting time to stopping time, there is a disadvantage in that the feedback cannot follow the tendency of the weighing amount to fluctuate sufficiently in the initial mode and the final mode during which the fluctuating tendency is greater. When the feedback controlling operation has been effected one by one to follow the variation in the filling amount of the final mode at the initial stage, one unexpected bad datum in the stable period of the steady mode of operation may be picked up. Even if all the container weighing operations are effected in this manner, there is a problem as to how the feedback controlling operation may be effected in accordance with the weighing results.

SUMMARY OF THE INVENTION

Accordingly, a first object of the present invention is to provide a filling apparatus equipped with a weighing apparatus, which makes it possible to effect an all container weighing operation, with the reduction in productivity being controlled to a minimum.

According to one preferred embodiment of the present invention, there is provided a filling apparatus having a weighing apparatus, which includes a conveyor for sequentially feeding empty containers, a first electronic balance for weighing empty containers transported by the conveyor, a filling machine for filling powder or liquid into the container transported from the first electronic balance, a second electronic balance for weighing the filled container transported from the filling machine, a carrying-out machine for carrying out the filled containers weighed by the second electronic balance, a container carrying apparatus provided with a driving mechanism having four chucks mounted at given intervals on a long operation bar so as to effect opening, shutting operations by air driving, and moving the operation bar in X, Y, Z directions, and which is characterized in that one container is grasped by each chuck of the container transporting apparatus and moved on the same track so as to move four at a time from the feed conveyer to the first electronic balance, from the first electronic balance to the filling machine, from the filling machine to the second electronic balance, and from the second electronic balance to the carrying-out machine, so that each empty container is weighed and each filled container is weighed during the overall filling operation, whereby an all container weighing operation is carried out.

As an electronic balance is disposed before and after the filling machine in the production line, and a container transporting apparatus capable of transporting four containers at a time is provided, the weighing of the empty containers and the weighing of the filled containers may be effected by electronic balances ahead of and behind the filling machine while the powder is being filled into containers in the filling machine. According to the present invention, an all container weighing operation may be effected without reduction in the efficiency of the filling operation.

The present invention seeks to overcome the problem wherein the high accuracy of weighing cannot be effected at high speed in a weighing apparatus using an electronic balance.

A second object of the present invention is to provide means to take in the data for each given constant time to turn the value into a weighing value when the difference between the maximum value and the minimum value of the data has become an established value or lower to improve the accuracy of the weighing value and to make the weighing speed faster, and a conductive cap is provided for the container during the weighing operation by the electronic balance to remove the influence of static electricity for improvement in weighing accuracy.

A weighing apparatus for weighing an extremely small amount according to the present invention comprises an electronic balance for outputting the weighing data with an approximately 0.1 mg or lower reading limit and in approximately 0.2 second or faster (preferably within the range of 0.05 to 0.1 second), a cap composed of a conductor for covering the container, such as a vial, ampoule or the like, when it is weighed by an electronic balance, and a means for raising and lowering the cap, a transport means for transporting the container onto the electronic balance and also, carrying it out after the container has been weighed, a weighing data apparatus for effecting the driving control of the cap raising and lowering means and the container transporting means and also outputting the data on the weighing value and sampling the weighing data normally outputted from the electronic balance and comparing the difference between the maximum value and the minimum value among a certain number of continuous sampled data, for example, the fifth through the thirtieth, with a predetermined stable detection judgment width, the difference has become the stable detection judgment width or lower.

By the weighing operation with the electronic balance through the use of the above-described weighing data processing apparatus, weighing time can be shortened and accuracy can be improved in comparison with the use of a conventional balance weighing stability detecting method or the like, and a weighing operation having an accuracy of 1 mg or lower for a material which is a nonconductor with static electricity therein can be effected, which is impossible with a conventional apparatus.

A third object of the present invention is to control the variation of the filling amount by a feedback controlling operation corresponding to the operation period of the filling machine so as to keep a constant control of the filing amount.

In order to achieve the above-described object, the present invention provides a filling amount control apparatus comprising a first electronic balance for weighing empty containers, a filling machine such as an auger filling machine or the like which fills powder or the like into a container after the empty container has been weighed, by the use of an auger operated rotatably by a servo-motor in a pulse generating system, a second electronic balance for weighing the filled container, which is adapted to weigh the filled container after the filling operation, a carrying apparatus for holding a container to automatically transport it from a transporting means for empty containers into the first electronic balance, from the first electronic balance to the auger filling machine, from the auger filling machine into the second electronic balance, from the second electronic balance to a defective product rejecting apparatus, data processing apparatus which calculates the net filled amount from the weight of the empty container from the first electronic balance and the weight of the filled container from the second electronic balance, controls the driving of the motor of the filling machine by feedback by controlling the rotation pulses of the motor based on the net filled amount, the target filling amount and the motor driving data (for example, the rotation pulses or the like of the motor) of the filling machine when the container has been filled, the feedback control being effected for each previous filling results in the initial mode and the final mode of the filling machine large when the tendency of the filling amount to fluctuate is large, and also, the feedback control from the average value of a plurality of continuous times, five times, etc. including the previous time in the steady mode with the tendency of the filling amount to fluctuate being small.

According to the filling amount control apparatus, it is possible to effect the feedback control in accordance with the previous weighing data, because a weighing apparatus which is capable of carrying out an all container weighing operation is used without damage to the productivity of the filling process. Because the feedback control system varies depending on the filling mode, which is divided into operation modes characterized by the variation of the filling amount and the tendency of the filling amount to fluctuate, a feedback control suitable for each of the respective operation modes can be effected, so that the filling amount variation and inferior filling can be kept to a minimum in each mode.

A fourth object of the present invention is to provide an apparatus which stops the auger in an emergency, such as when powder has clogged the measuring portion or the like in a case where an auger filling machine is used as a powder filling machine.

In order to achieve the above-described object, there is provided an emergency stop apparatus for an auger in an auger filling machine which has a cylindrical auger casing mounted at the tip end of a funnel having the powder accomodated therein, has an auger secured to a rotary shaft and extending into the auger casing so as to dispense the powder during weighing in accordance with the rotary angle of the auger to fill it into a container or the like, and which is characterized in that a servo-motor is used as a driving means for rotating the rotary shaft to rotate the auger. The rotation of the auger is adapted to stop when overtorque occurs because of clogging between the auger casing and the auger. A control circuit is provided for stopping the rotation of the rotating servo-motor after the passage of the logical rotation time of the servo-motor for the filling of a given amount of powder into one container and by a time point when a given abnormality can be detected.

By the use of a servo-motor as described above as the driving mechanism for the auger, the rotation of the servomotor does not stop even if the rotation is improper and the given stop time passes, so that overtorque caused by powder clogging can be detected easily. Thus, when powder clogging has occurred, it can be detected quickly to stop the auger. Accordingly, accidents such as auger failure, screen failure, etc. can be prevented.

BRIEF DESCRIPTION OF THE DRAWINGS

These and other objects and features of the present invention will become apparent from the following description of a preferred embodiment thereof taken in conjunction with the accompanying drawings, in which:

FIG. 4 is a diagram showing the weighing function in balances 3 and 5 of FIG. 1;

FIG. 6 is a diagram showing the filling operation;

DETAILED DESCRIPTION OF THE INVENTION

Figure 1:
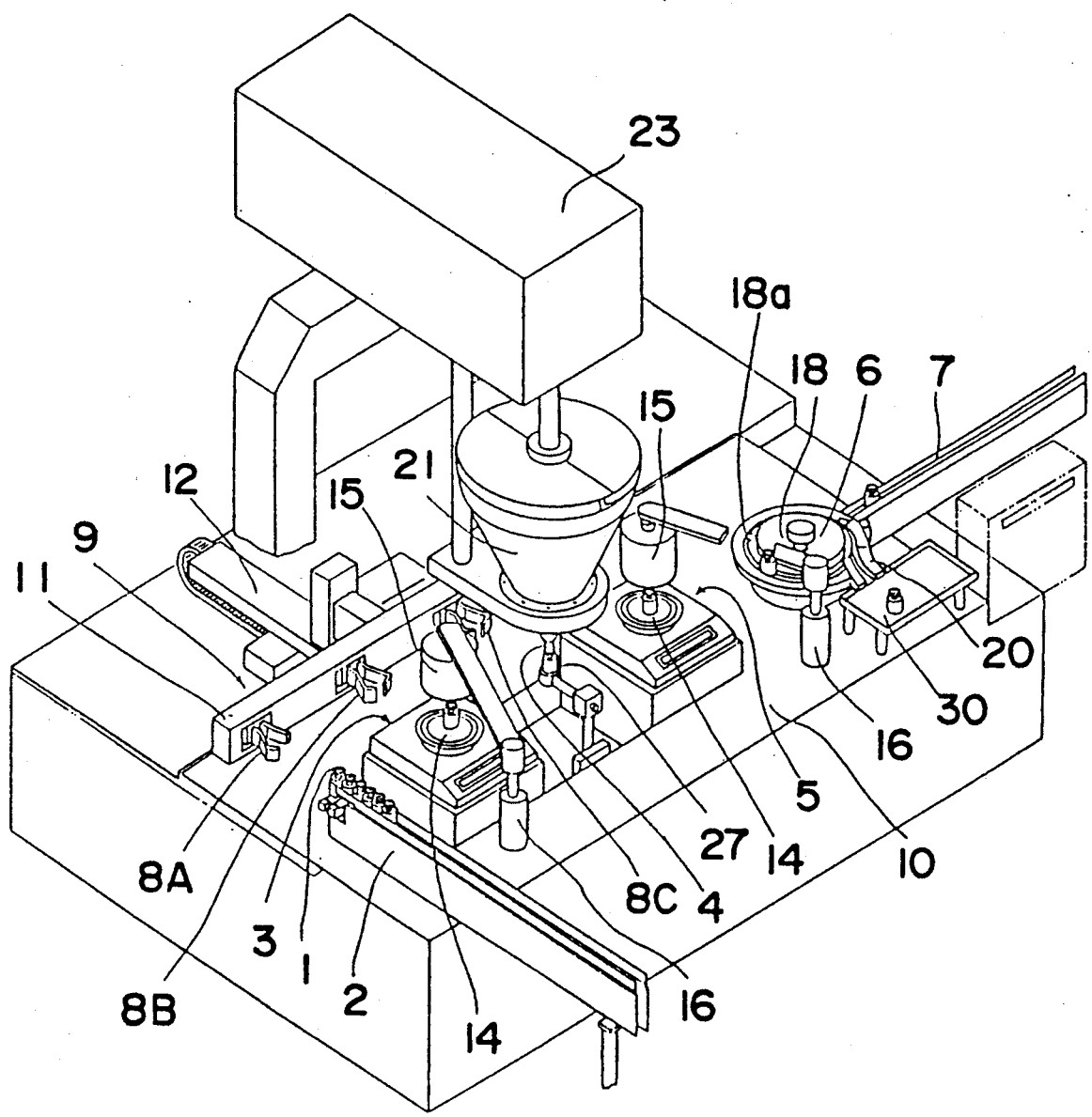
FIG. 1 is a perspective view of a filling apparatus according to an embodiment of the present invention.

Before proceeding with the description of the present invention, it is to be noted that like parts are designated by like reference numerals throughout the accompanying drawings.

Figure 2:
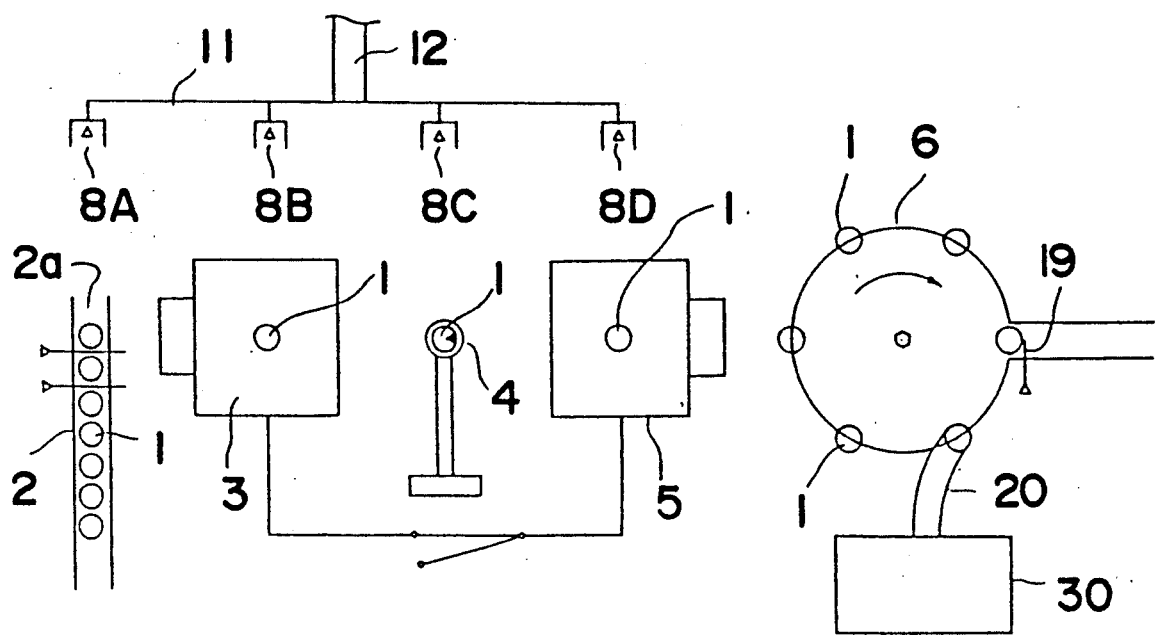
FIG. 2 is a schematic plan view showing an arrangement of the main components of the apparatus shown in FIG. 1.

Referring now to the drawings, there is shown in FIG. 1 the entire filling apparatus, and in FIG. 2 the construction of a chuck, etc., according to one preferred embodiment of the present invention, which is for filling vials 1 as one kind of container. The apparatus has a base 10, a feed conveyer 2 for delivering empty vials to a feed station, a first electronic balance 3 for weighing the empty vials, a powder filling machine 4 for filling the powder into an empty vial after it has been weighed by the first electronic balance 3, a second electronic balance 5 for weighing the vial after it has been filled with the powder, a defective product rejecting apparatus 6 at a delivery station for rejecting defective products in which the weight thereof deviates from the given control range, a take-out conveyer 7, a container transporting apparatus 9 and having a mounting means in the form of a long operation bar 11 mounted on a driving mechanism 12, to transport the vials onto each apparatus, the operation bar having four chucks 8A, 8B, 8C, 8D mounted at equal intervals therealong as shown.

Figure 3:
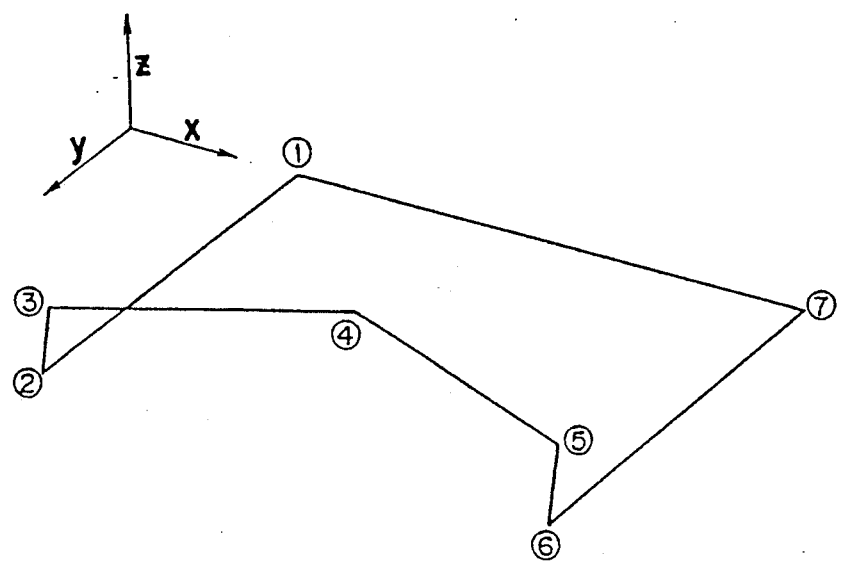
FIG. 3 is a chart showing the movement of chucks 8A through 8D of FIG. 1.

The feed station at the end of feed conveyor 2, the first electronic balance 3, the powder filling machine 4, the second electronic balance 5 and the delivery station at which the defective product rejecting apparatus 6 is located are disposed on the base 10 in a line parallel to and at the same equal intervals as the chucks. The container transporting apparatus 9 for simultaneously moving four chucks 8A–8D in the directions X, Y and Z has a long operation bar 11 disposed on the base 10 and on X, Y and Z driving mechanism 12. According to the construction thereof, respective chucks 8A–8D are mounted on the operation bar 11, which is moved to the positions of (1)→(2)→......(7)→(1), along a track as shown in FIG. 3, by the driving mechanism 2. For example, the chuck 8A moves in the Y direction from a retracted position (1) to a position (2) at the end of the feed conveyer 2 to grip a vial positioned at the exit 2a of the feed conveyer 2. After it has gripped the vial, it moves in the Z direction to move into the position (3) and subsequently moves in the X and Y directions so as to move to the position (4) toward the first electronic balance 3. It then moves in the X-Y direction from the position (4) to the position (5) above the vial supporting position of the first electronic balance 3. It then moves in the Z direction downwardly from the position (5) to the vial supporting position (6) of the first electronic balance 3 and releases the vial 1 from the chuck to leave it on the balance 3. Thereafter, the empty chuck moves in the Y direction and retracts. When it reaches the position (7), it moves in the X direction to return to the original position (1). The other chucks 8B, 8C and 8D move on parallel tracks simultaneously with the movement of the chuck 8A. In this manner, transportation of a vial to the first electronic balance 3 from the feed conveyer 2 by the chuck 8A, transportion of a vial into the powder filling machine 4 from the electronic balance 3 by the chuck 8B, transportation of a vial to the second electronic balance 5 from the powder filling machine by the chuck 8C, and transportion of a vial into the defective product rejecting apparatus 6 from the second electronic balance 5 by the chuck 8D, namely, four transportations, are simultaneously effected by the container transporting apparatus 9.

The first electronic balance 3 and the second electronic balance 5 have respectively a weighing plate 14 on the central top face of the electronic balance main bodies 3 and 5a, and a metallic cap 15 above the weighing plate and movable vertically by an air cylinder 16 disposed above the weighing plate 14. The metallic cap 15 made of an electrically conductive material is adapted to be put over the vial 1 on the weighing plate 14 during the weighing operation, with the diameter of the lower edge thereof being larger than the diameter of the weighing plate 14. During the capping operation, the cap does not come into contact against the weighing plate 14. The dimensions are such that the whole lower end of the cap comes into contact against the corresponding electronic balance main body 3a or 5a to fully shield the vial. The weighing plate 14 and the vial 1 placed on it are isolated by the metallic cap 15 from the outside during the weighing operation, so that the effect of wind pressure is avoided and also any magnetic field is blocked to prevent static electricity from acting as an outer force on the weighing plate 14. Thus, weighing errors caused by static electricity and indoor wind during the weighing operation of the extremely small filling amounts can be avoided, thus ensuring a precise weighing operation. In the weighing by the first and second electronic balances 3 and 5, the vial 1 is placed by the respective chuck onto the weighing plate 14 as shown in FIG. 4, thereafter the metallic cap 15 is lowered over the vial 1 and the weighing plate 14. Thereafter, after the stabilization thereof for a required time period, the weighing operation is effected. After the weighing operation, the metallic cap 15 is raised and the vial 1 is gripped by the respective chuck for removal from the weighing plate 14.

Figure 7:
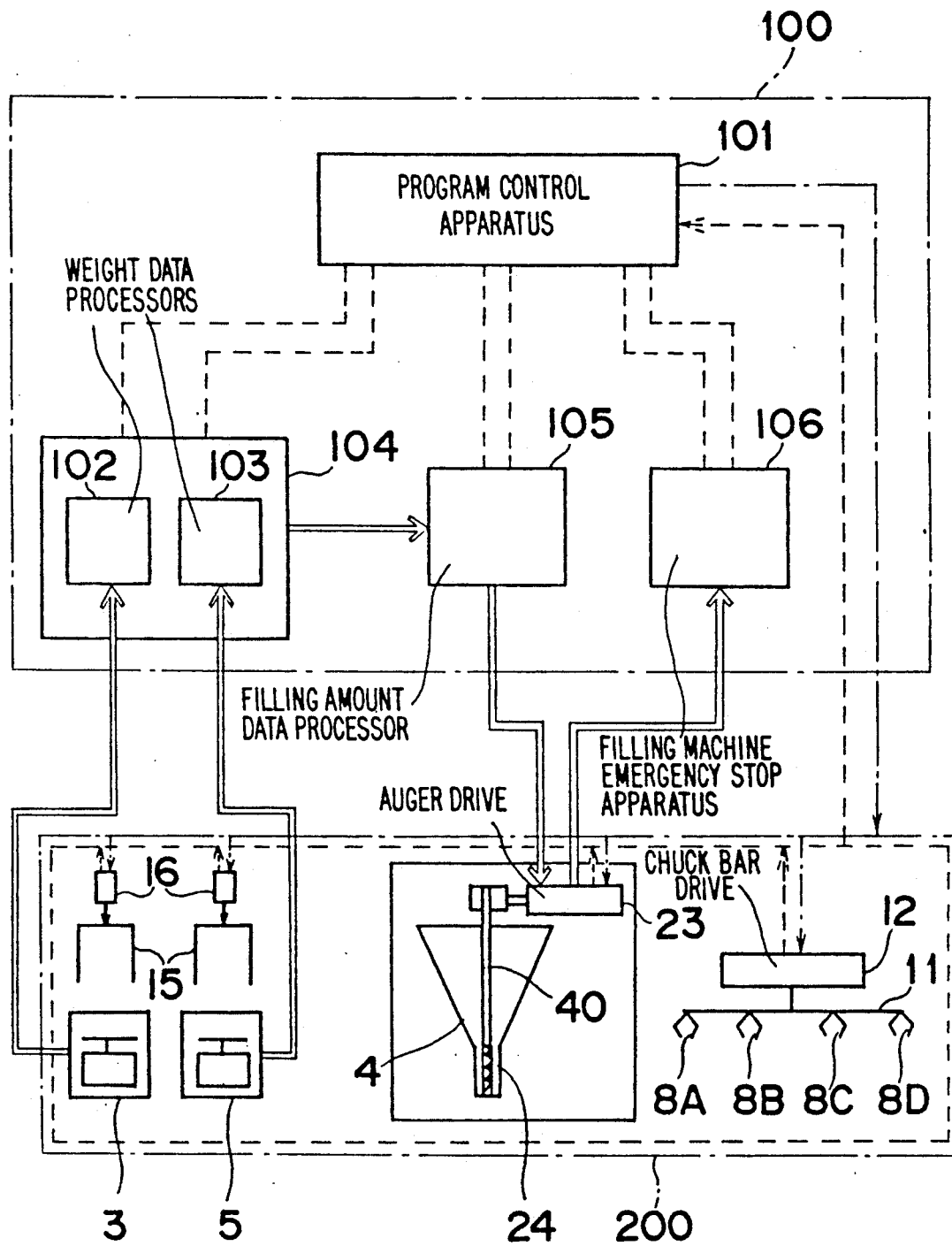
FIG. 7 is a block diagram showing the control apparatus for the filling apparatus of the present invention.
Figure 8:
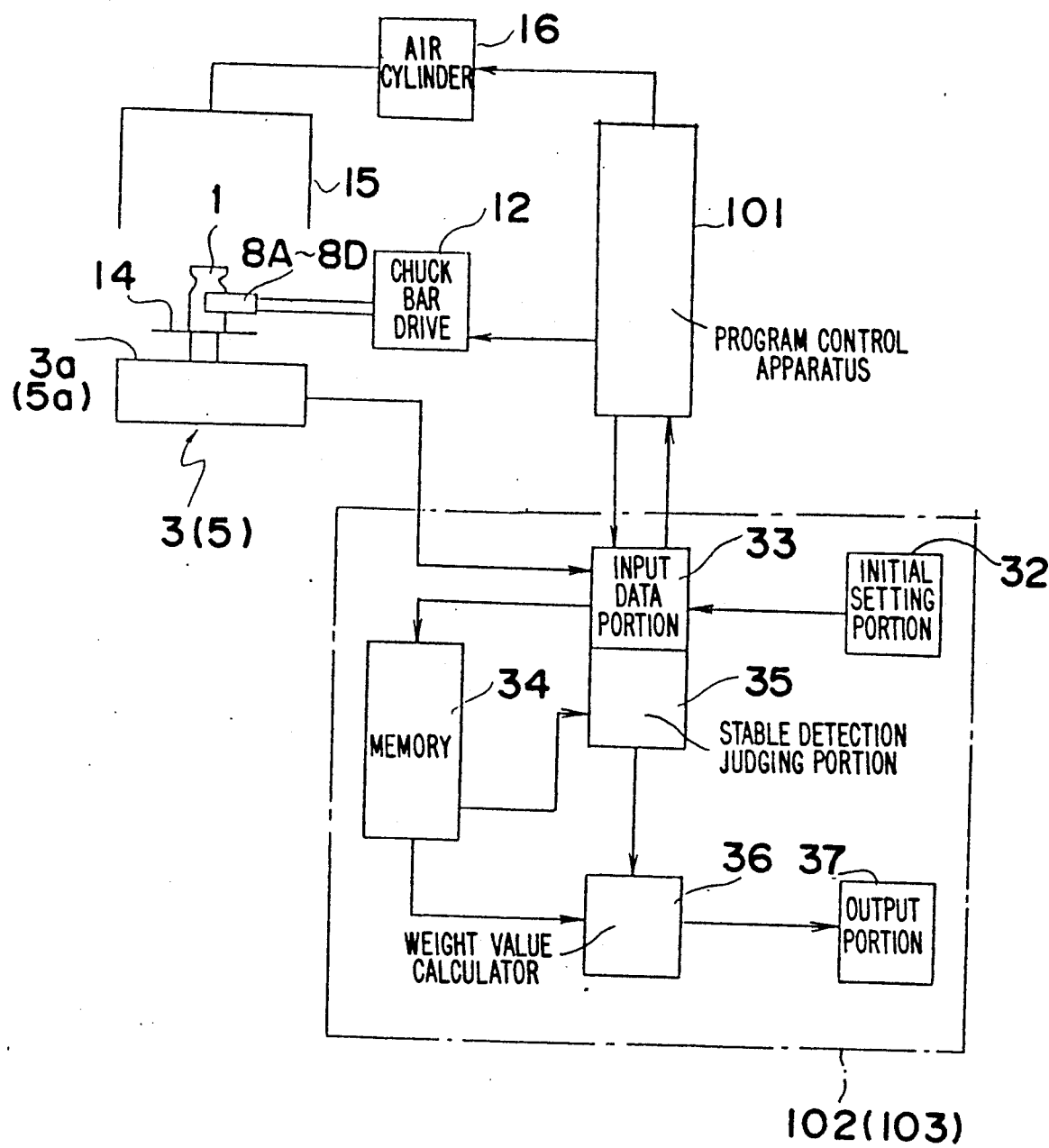
FIG. 8 is a block diagram of a data processing apparatus for an electronic balance.

The data for the weight value of the empty vial 1 weighed by the first electronic balance 3 and the data for the weight value of the vial 1 after filling as weighed by the second electronic balance 5 are inputted into the first and second weight data processing apparatuses 102 and 103, as shown in FIGS. 7 and 8, to be described later. The amount of powder filled into each vial is calculated by the subtraction of the output of the first weight data processing apparatus 102 from the output of the second weight data processing apparatus 103 and the calculated value is output from the weight data processing apparatus 104 for comparing the amount filled into the vial with the target value. If it is beyond the set control range, it is considered as a defective product and is rejected by the defective product rejecting apparatus 6. As shown in FIGS. 1 and 2, the defective product rejecting apparatus 6 is rotated clockwise as shown in FIG. 2 with the vial 1 being accommodated in a concave portion 18a for accommodating the vial formed at intervals on the outer periphery of the star wheel 18. A take-out conveyor 7 is provided on the rotational path, with a shutter 19 being mounted at the entrance thereto. When the shutter 19 is open, the vial 1 carried by the star wheel is adapted to be automatically fed to the take-out conveyor 7. When the shutter 19 is closed, the vial is guided into a defective product side passage 20 along the rotational path at a position past the take-out conveyor 7 so that it is taken out into a defective product receiving means 30. The shutter 19 is closed when a rejecting signal is outputted from the control apparatus to be described later so as to reject the vial which is outside the given control range for the filling amount. In the above-described embodiment, the defective product rejecting apparatus 6 is provided at the delivery station at the end of the line having the delivery station, the first electronic balance 3, the powder filling machine 4 and the second electronic balance 5 therealong, but a take-out conveyor for effecting only the function of carrying the filled container to the next step or a carrying machine for a star wheel or the like may be provided at the delivery station. In such case, a defective product rejection apparatus may be provided at a position along the carrying path on the downstream side of the take-out conveyor.

Figure 5:
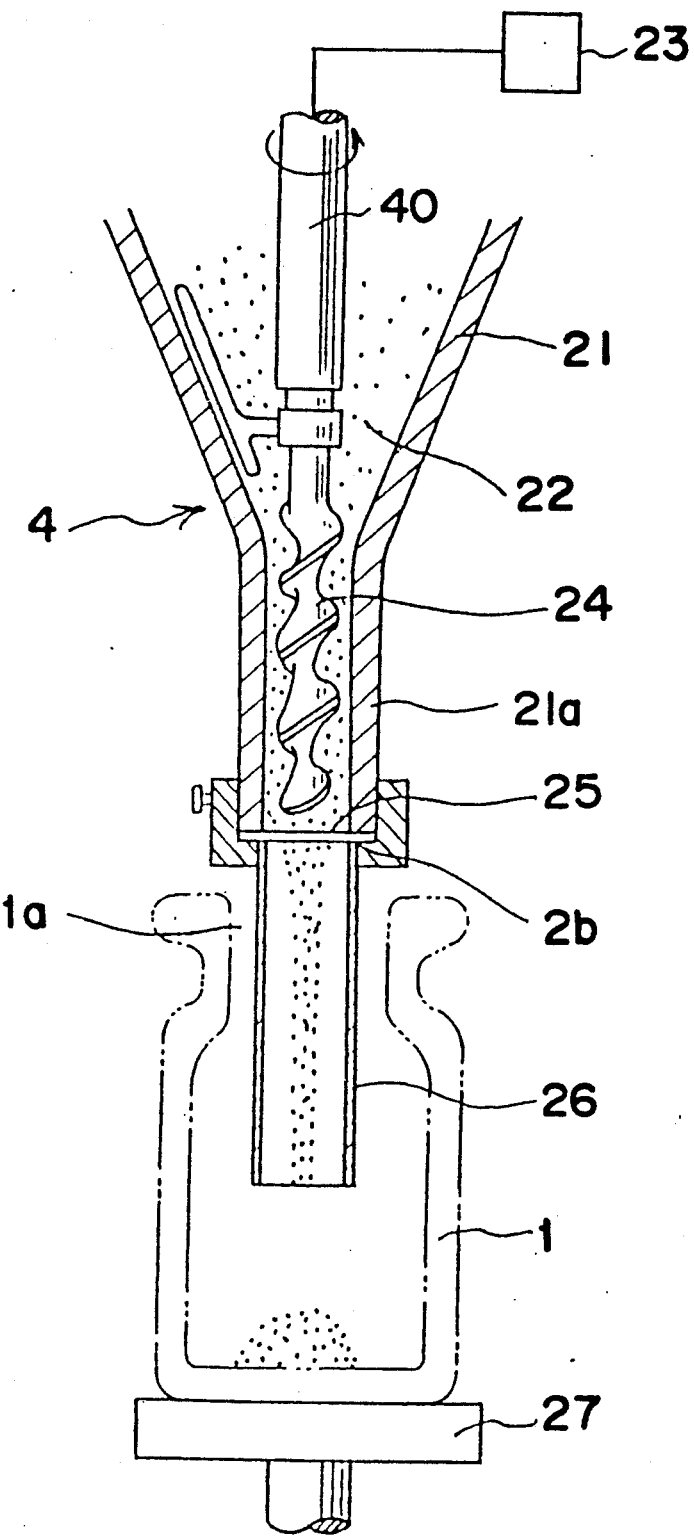
FIG. 5 is a sectional view of the essential portions of a powder filling machine.

The powder filling machine 4 to be used in the present apparatus has an auger filling machine as shown in FIG. 5. The powder 22 supplied into the funnel 21 is filled in a desired amount into the vial 1 and through screen 25 in accordance with the amount of rotation of the auger 24 which is rotated by the driving apparatus 23. In the drawings, a skirt 26 is provided on the lower portion of the screen 25. The filling operation of the powder filling machine 4 is shown in FIG. 6. After the empty vial 1 has been placed on the holder 27 of the powder filling machine 4 by the chuck 8B, the holder 27 rises so as to cause the skirt 26 to go into the open upper end 1a of the vial 1. Thereafter, the auger 24 is rotated to fill the desired amount of the powder 22 into the vial 1. After the filling completion, the holder 27 is lowered and returned to a previous position. Then, the vial 1 is taken out by the chuck 8C and is transported onto the second electronic balance 5. The raising and lowering operations of the holder 27 are also controlled by the program control apparatus 101 shown in FIG. 7.

As described above, according to the present device, all the empty vials 1 to be fed from the feed conveyor 2 are first transported onto the first electronic balance 3, where the empty vials are weighed. Then they are transported onto the powder filling machine 4 so as to be filled with powder. All the filled vials are also transported onto the second electronic balance 5. After the weighing operation, they are transported onto the defective product rejecting apparatus 6. The filled vials with the exception of the defective products are transported on the take-out conveyor 7 to the next step. As the weighing operations of the empty vial and the filled vial are effected with respect to all of the vials, anything wrong with the filling amount which is caused due to some unexpected reason can be positively detected.

Four transporting operations, i.e. that from the feed conveyor 2 into the first electronic balance 3, that from the first electronic balance 3 into the powder filling machine 4, that from the powder filling machine 4 into the second electronic balance 5, and that from the second electronic balance 5 into the defective product rejecting apparatus 6, are simultaneously effected. While the filling operation is effected with respect to one vial, the vial before and the vial after the vial being filled are weighed. Thus vials are weighed before being filled with powder and after being filled with powder. Thus, the productivity of the filling operation is not interfered with by the weighing, thus allowing all the containers to be weighed efficiently.

The X, Y and Z driving mechanism 12 for the above-described chucks 8A-8D, the driving apparatus 23 for the auger powder filling machine 4, the air cylinders 16 for raising and lowering the covers 15 for the first electronic balance 3 and the second electronic balance 5, and a raising and lowering means (not shown) for the holder 27 are controlled by on-off signals from a program control apparatus 101 within a control apparatus 100 for the whole apparatus as shown in FIG. 7. Each driving means such as for the shutter 19 or the like for the defective product rejecting apparatus 6 for the filling apparatus shown in FIG. 1 is also controlled by the program controlled apparatus 101.

Also, a data processing apparatus 105 for controlling the filling amount and connected with the weight data processing apparatus 104 is provided within the control apparatus 100. The driving apparatus 23 for the auger filling machine 4 is controlled in feedback by the data processing apparatus 105 to control the filling amount. Furthermore, a processing apparatus 106 for emergency stopping of the auger filling machine is provided within the control apparatus 100, so that when powder clogging or the like occurs in the auger filling machine 4, the auger is stopped to prevent a breakdown.

In FIG. 7, the double-line arrows show data signals, the dotted-line arrows show synchronous signals, and the one-dot chain line arrows show on-off control signals or the like. The weight value data signal is inputted into the first and second weight data processing apparatuses from the first and second electronic balances 3 and 5 and also the driving signal (pulse signal) is inputted into the processing apparatus 106 from the servo-motor of the driving apparatus 23 of the filling machine 4. A data signal for controlling the amount of pulse rotation driving the filling machine 4 is outputted from the data processing apparatus 105. On-off driving control signals are outputted to each driving apparatus of the filling apparatus (shown by reference character 200 in FIG. 7) shown in FIG. 1 from the program control apparatus 101.

Each processing apparatus which is disposed within the control apparatus 100 will be described below.

First, the weight data processing apparatuses 102, 103 and 104 for improving the accuracy of the filling amount and increasing the weighing speed by the electronic balances 3 and 5 will be described.

The electronic balances 3 and 5 which have a 0.1 mg sensitivity limit are connected to the first and second data processing apparatuses 102 and 103 as shown in FIG. 7. A synchronous signal generating apparatus (not shown) for outputting a synchronous signal when a vial 1 is placed on the weigh plate 14 is provided to output a digital signal corresponding to the weight value for each 0.1 second in the course of a weighing operation. The first and second electronic balances 3 and 5 effect a zero setting operation at proper intervals.

The first and second weight data processing apparatuses 102 and 103, which each have the construction shown in FIG. 8, are adapted to output the weight value from the weight data processing apparatus 104 by subtraction of the output values of the apparatuses 102 and 103. The first and second weight data processing apparatuses are provided with an initial setting portion 32, the input data portion 33, the memory portion 34, the stable detection judging portion 35, the weight value calculating portion 36, and the output portion 37 as shown in FIG. 8.

As described above, the program control apparatus 101 effects the operation control by on-off driving of the chuck bar drive mechanism 12 for transporting the vial 1 and the air cylinder 16 for raising and lowering the metallic cap 15, and also outputs into the input data control portion 33 the weigh starting signal after the metallic cap is lowered. The initial setting portion 32 sets a repeating counter (1), a temporary maximum value (W max), a temporary minimum value (W min), a sample data reference numeral (n), and a stable detection judgment width ($\epsilon$), and inputs these initial set values into the input data control portion 33. The input data control portion 33 effects the inputting of the output weight data of the electronic balances 3 and 5 and the calculation of the difference (R) of W max, W min. The memory portion 34 stores W (I), W max, W min, R inputted from the input data control portion 33, and effects the data shift from W (I) into W (I-1) into (I-2), ..... from W3 into W2, from W2 into W1 so as to output the stored data into the stable output judgment portion 35 and the weight value calculation portion 36. The stable output judgment portion 35 compares the difference R between the maximum weight value and the minimum weight value with the stable detection judging width e so as to output the calculation of the weight value into the weight value calculation portion 36 in $R \leq \epsilon$. In the weight value calculation portion 36, the weight value W is calculated from $\Sigma Wi/n$ to output the weight W into the output portion 37.

The subtraction of the output value of the first weight data processing apparatus 102 from that of the second weight data processing apparatus 103 is effected. Namely, the output weight value of the empty container is subtracted from the output weight value of the filled container to output the net powder filling amount from the weight data processing apparatus 104.

Figure 9:
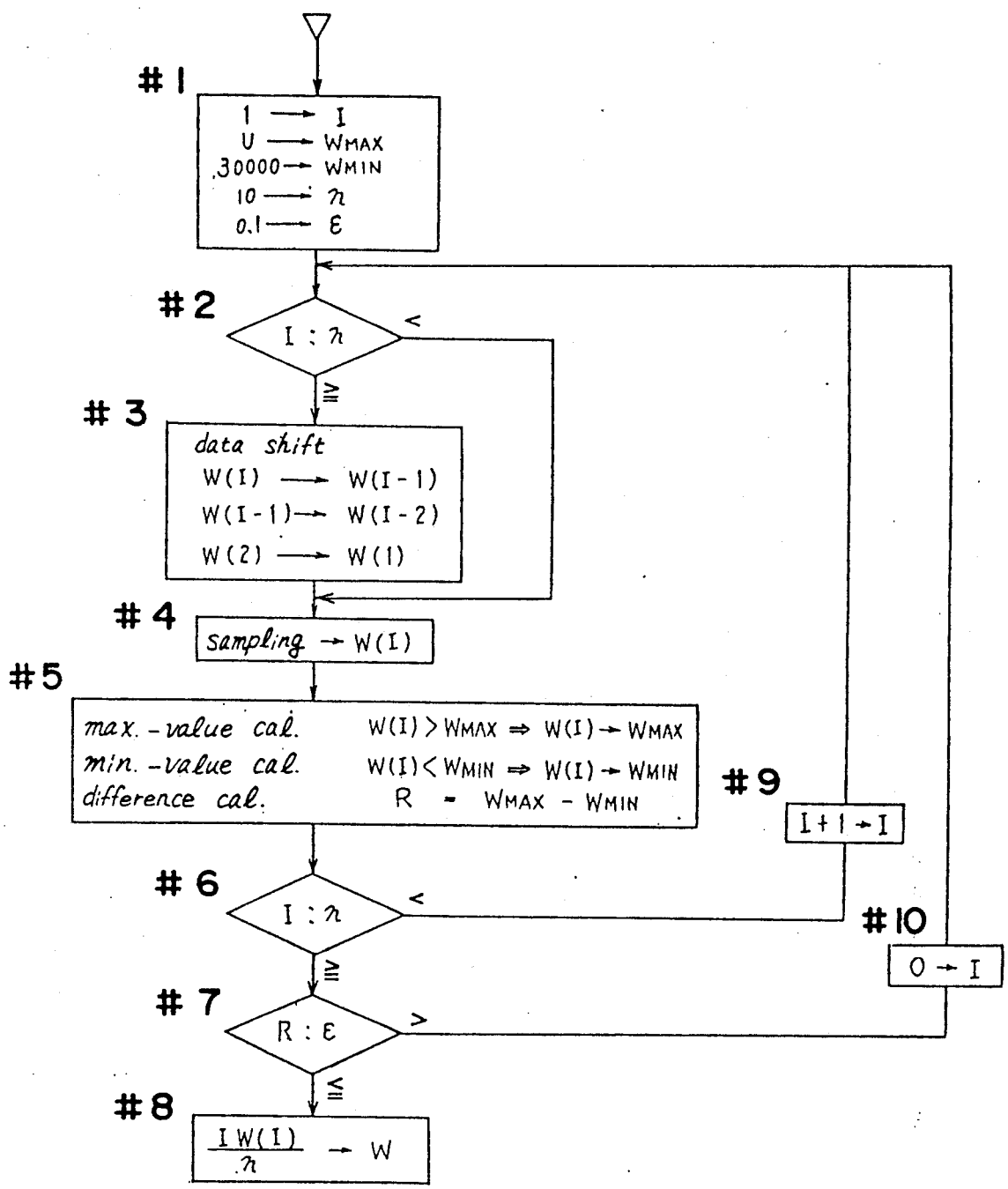
FIG. 9 is a flow chart for the data processing apparatus of FIG. 8.

The first and second weight data processing apparatuses 102 and 103 operate in the order shown in steps #1-#10 of the flow chart of FIG. 9 to calculate the weight value W. Namely, the initial setting is effected at step #1, the count up is judged at step #2, the data shift is effected at step #3, the data sampling is effected at step #4, the difference (R) between the maximum value and the minimum value is calculated at step #5, the count up is judged at step #6, the comparison between the difference (R) and the stable detection judgment width (s) is effected at step #7, and the weight value W is calculated at step #8. The operation advances to step #4, skipping step #2 when 1<n at step #2. Furthermore, the operation advances to step #9 when 1<n at step #6 to renew the count. The operation advances to step #10 when R>$\epsilon$. In the flow chart, step #10 can be omitted so as to adopt a method of effecting the outputting operation upon stabilization by the data shift. In this case, the weight value W can be obtained quickly, which is referred to as a high speed type operation hereinafter. Also, there may be adopted a method of omitting step #2 and step #3 with the sample data being divided n by n, which is hereinafter referred to as a memory saving type operation. As described later, the high speed type and the memory saving type operations are quite similar in their effect on accuracy although the memory saving type operation is slightly slower in terms of time as compared with the high speed type operation.

(Embodiment)

A container (vial) of about 20 g (actual value = 19998.0 mg) was placed on the electronic balance 5. A metallic cap 15 was placed over it. The weight data was taken in by the computer to obtain the various data shown in Table 1 given hereinbelow.

* Time [0.1 second] . . . elapsed time from immediately before the start of increase in the weight data from zero.

data [0.1 mg] . . . rough data of the weight amount fed into the computer in a normal output mode from the electronic balance.

* Difference from the true value . . . difference from the true value of the weight of 19998.0 mg of the container.

* Present invention . . . when the weighing has been effected under the control according to the present invention with the above-described control apparatus shown in FIG. 8.

. R for the stable detection judgment of the present invention (the value of |W max−W min|) . . . R when the sample data reference number is eight in n.

Stable detection value . . . average value of the data difference with respect to eight true values when R becomes 0.3 mg, 0.2 mg, 0.1 mg, 0.0 mg.

* Balance reference stable detection method . . . when the weighing operation is effected by the conventional stable detecting method, a parameter of the stable detection of the balance is set to a proper value (integrated time 0.8 seconds, automatic stable detection 0.05 mg).

. Average value . . . average value in the integrated time of 0.8 seconds.

. Difference in average value . . . difference with respect to the former average value.

TABLE 1

| time [0.1 sec.] | weighing rough data [0.1 mg] | dif. from true value [0.1 mg] | present invention MAX-MIN R | stable dec. val | balance state detection ave. value [0.8 sec.] | dif. in ave. value [0.8 mg] |
|---|---|---|---|---|---|---|
| 0 | −28 | −200008 | 13 | | | |
| 1 | 31 | −199949 | 59 | | | |
| 2 | 15553 | −184427 | 15581 | | | |
| 3 | 47027 | −152953 | 47055 | | −62433.0 | |
| 4 | 74178 | −125802 | 74206 | | | |
| 5 | 101197 | −98783 | 101225 | | | |
| 6 | 125795 | −74185 | 125823 | | | |
| 7 | 164140 | −35840 | 164168 | | | |
| 8 | 189294 | −10686 | 189263 | | | |
| 9 | 198371 | −1609 | 182818 | | | |
| 10 | 200373 | 393 | 153346 | | | |
| 11 | 200346 | 366 | 126195 | | 57.50 | 62490.5 |
| 12 | 200112 | 132 | 99176 | | | |
| 13 | 199993 | 13 | 74578 | | | |
| 14 | 199967 | −13 | 36233 | | | |
| 15 | 199969 | −11 | 11079 | | | |
| 16 | 199970 | −10 | 2002 | | | |
| 17 | 199971 | −9 | 406 | | | |
| 18 | 199972 | −8 | 379 | | | |
| 19 | 199974 | −5 | 145 | | −3.50 | 61.00 |
| 20 | 199975 | −5 | 26 | | | |
| 21 | 199976 | −4 | 9 | | | |
| 22 | 199977 | −3 | 8 | | | |
| 23 | 199977 | −3 | 7 | | | |
| 24 | 199977 | −3 | 6 | | | |
| 25 | 199978 | −2 | 6 | | | |
| 26 | 199978 | −2 | 3 | −3.4 | | |
| 27 | 199978 | −2 | 3 | | −1.63 | 1.87 |
| 28 | 199978 | −2 | 2 | −2.6 | | |
| 29 | 199978 | −2 | 1 | −2.3 | | |
| 30 | 199978 | −2 | 1 | | | |
| 31 | 199979 | −1 | 1 | | | |
| 32 | 199978 | −2 | 1 | | | |
| 33 | 199979 | −1 | 1 | | | |
| 34 | 199979 | −1 | 1 | | | |
| 35 | 199979 | −1 | 1 | | −1.00 | 0.63 |
| 36 | 199979 | −1 | 1 | | | |
| 37 | 199979 | −1 | 1 | | | |
| 38 | 199979 | −1 | 1 | | | |
| 39 | 199979 | −1 | 1 | | | |
| 40 | 199979 | −1 | 0 | −1.0 (high-speed type stable detc) | | |
| 41 | 199979 | −1 | 0 | | | |
| 42 | 199979 | −1 | 0 | −1.0 (mem.-type stable detection) | | |
| 43 | 199979 | −1 | 0 | | −1.00 | 0.00 |
| 44 | 199979 | −1 | 0 | | | (stable detection) |
| 45 | 199979 | −1 | 0 | | | |
| 46 | 199979 | −1 | 0 | | | |

TABLE 1-continued

| time [0.1 sec.] | weighing rough data [0.1 mg] | dif. from true value [0.1 mg] | present invention MAX-MIN R | stable dec. val | balance state detection ave. value [0.8 sec.] | dif. in ave. value [0.8 mg] |
|---|---|---|---|---|---|---|
| 47 | 199979 | −1 | 0 | | | |
| 48 | 199979 | −1 | 0 | | | |
| 49 | 199979 | −1 | 0 | | | |
| 50 | 199979 | −1 | 0 | | | |
| 51 | 199979 | −1 | 0 | | −1.00 | 0.00 |
| 52 | 199979 | −1 | 0 | | | |
| 53 | 199979 | −1 | 0 | | | |
| 54 | 199979 | −1 | 0 | | | |
| 55 | 199979 | −1 | 0 | | | |
| 56 | 199979 | −1 | 0 | | | |
| 57 | 199979 | −1 | 0 | | | |
| 58 | 199979 | −1 | 0 | | | |
| 59 | 199979 | −1 | 0 | | | |
| 60 | 199979 | −1 | 0 | | | |

Figure 10:
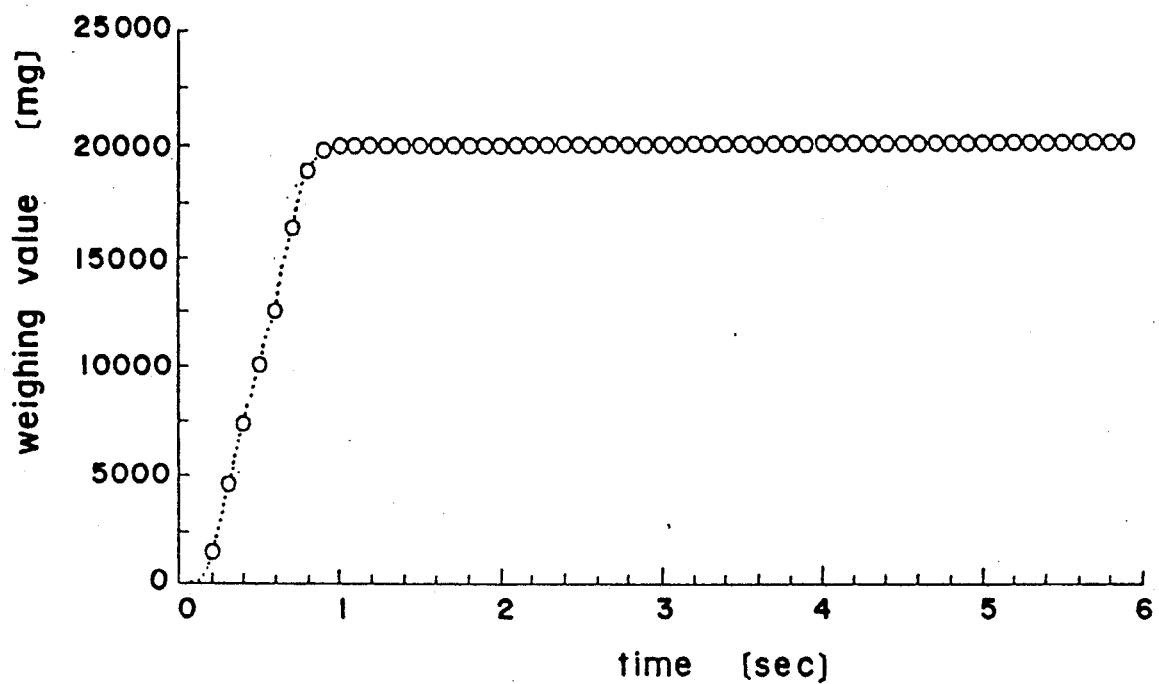
FIGS. 10 and 11 are graphs showing the weighing characteristics of the electronic balance.
Figure 11:
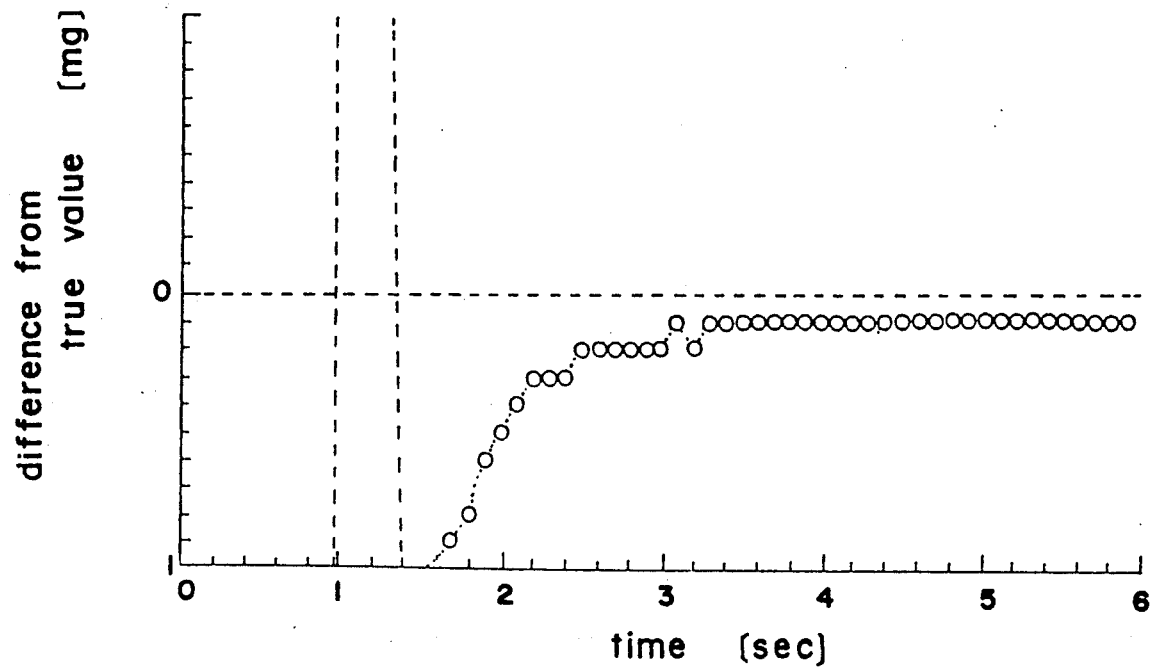

The difference between the rough data of the weight and the true value described in Table 1 showing the characteristics of the electronic balances are shown in the charts of FIGS. 10 and 11.

The stable detection judgment width R in the present invention (in the above-described high-speed type operation) shown in Table 1 is 0.3 mg, 0.2 mg. 01. mg, 0.0 mg, with the difference between the time and the true value described in Table 2. The difference between the time and the true value for the conventional balance reference stable detection. method is also described in Table 2.

TABLE 2

| stable detection width (mg) | present invention (high-speed type) | | | | bal. stable detec. function. integrated time 0.8 sec. |
|---|---|---|---|---|---|
| | 0.3 | 0.2 | 0.1 | 0.0 | auto. stable detec. 0.05 mg |
| time (second) | 2.6 | 2.8 | 2.9 | 4.0 | 5.0 |
| dif. (mg) from true value | 0.34 | 0.26 | 0.23 | 0.10 | 0.10 |

Also, the data for repetition n times where n+30 are as shown in Table 3.

TABLE 3

| accuracy (dif. from true val.) | balance stable detection function | present invention high-speed type | present invention memory saving type |
|---|---|---|---|
| 0.3 (mg) | 3.3 (sec.) | 2.2 (sec.) | 2.4 (sec.) |
| 0.2 | 4.4 | 3.1 | 3.5 |
| 0.1 | 5.3 | 4.2 | 4.6 |

As is clear from the above-described experimental results, according to the present invention, the same accuracy as with a conventional balance stable detecting method but in about a second less time (when the accuracy has been defined with the difference from the true value), and also the weighing accuracy can be improved by about 0.1 mg where the stable time is the same for the conventional method and the present method.

Especially for medical drug manufacturing where strict and accurate control must be provided, the accuracy is improved, and a one-second reduction of the conventional weighing time in a five second weighing cycle is a reduction of about 20%, thus resulting in extremely great improvements in productivity.

In the present filling apparatus, the weighing is effected with a conductive metallic cap over the vial, so that the negative influence of static electricity is prevented, thus further improving the weighing accuracy. It is possible to effect the weighing operation with an accuracy of 1 mg or lower of a non-conductor which is subject to being charged with static electricity, which is impossible with the conventional weighing apparatus. Accordingly, when an extremely small amount of powder must be filled with the accuracy of 1 mg or lower into a glass vial, the present weighing apparatus makes it possible to fill with an accuracy as described above.

In the present filling apparatus, a data processing apparatus 105 for control of the filling amount is provided within the control apparatus 100 so as to keep the amount of powder filled into the vial within the control amount in accordance with the weighing data from the weighing data processing apparatus 104. The data processing apparatus 105 feedback-controls the auger filling machine during the operating period to control the filling amount.

As described above, the auger filling machine 4 shown in FIG. 5 fills a given amount into the vial 1 through the screen 25 and the skirt 26 by a corresponding amount of rotation of the auger 24 rotated by the driving apparatus 23. A pulse driven servo-motor is used as a driving apparatus 23 for the auger 24. For example, for one container, the auger 24 is rotated four times by 20,000 pulses so that 100 mg of powder is filled into the container 1.

In the auger filling machine 4, after a large amount of powder 22 has been placed in the funnel 21 during the powder filling operation, a cover (not shown) is put on the funnel 21 to enclose the powder. In this condition, the servomotor is started as described above to intermittently rotate the auger 24. The filling amount of powder 22 is sequentially subdivided from the filled powder in the container 1 and fed to successive vials by the auger. When the powder 22 in the funnel 21 is depleted, driving of the servo-motor is stopped and a new supply of powder is supplied into the funnel 21. For example, 100 mg of powder is supplied at one time into the funnel 21 to be filled into 1,000 containers.

In the auger filling machine 4, the variation of the filling amount is large in the initial mode at the starting time of the servo-motor, but in the later steady mode, the variation is reduced, while in the final mode, the variation becomes larger again.

Because the variation of the filling amount occurs during the various operation modes from the starting time of the auger filling machine 4 to the stopping time, the servo-motor for driving the auger 24 is feedback-controlled in accordance with the particular operation mode, so that the amount of powder 22 filled into each vial 1 will be kept within the given control width.

The feedback control effects three feedback controls (1), (2) and (3) given below in accordance with the operation mode of the auger filling machine 4.

(1) Initial mode . . . feedback control n=1

$$Vn = Vn - 1 \cdot Xs/Xn - 1$$

(2) Steady mode . . . feedback control n=5

$$Vn = Vn - 1 \cdot Xs/Xav$$

(3) Final Mode . . . feedback control n=1

$$Vn = Vn - 1 \cdot Xs/Xn - 1$$

In the above equations,

| | |
|---|---|
| V: | amount of rotation of the servo-motor |
| n: | current filling operation |
| n − 1: | previous filling operation |
| Xs: | target filling amount |
| Xav: | five times average filling amount |
| Vn: | amount of pulsed rotational movement of the servo-motor to be feedback-controlled for current filling operation |
| Vn − 1: | amount of pulsed rotational movement of the servo-motor during previous filling operation |

The switching from the initial mode into the steady mode, and from the steady mode into the final mode is effected when the number of filling operations has reached a predetermined mode switching reference number.

In the feedback control, the initial mode and the final mode are n+1 as described above, because the powder filling amount for the respective containers can be provided within the target control width during the initial and final modes if the servo-motor is feedback-controlled for each filling depending on the powder filling amount of the previous filling, because the variation of the filling amount is large during these modes.

In the steady mode, if the feedback control is effected from the data for a single preceding operation where the filling amount has been changed for some unexpected reason and the variation of the filling amount is large, there is the inconvenience that the filing amount does not move into the target control width after the controlling operation has been effected. Thus, in the steady mode n=5. The feed-back control is effected from the average value of the five previous filling amounts.

In the filling apparatus shown in FIG. 1, a container, whose net weight is calculated by the data processing apparatus after weighing has been effected by the second electronic balance 5 relative to the container to be filled by the auger filling machine 4, is a container of the time before the previous time, so that all the (n−1) of the previous equation becomes (n−2).

As shown in FIG. 7, the feedback control positively inputs into the data processing apparatus 105 as a data signal the net filling amount outputted from the weighing data processing apparatus 104 determined from the subtraction of the weight data of the first electronic balance 3 and the second electronic balance 5. In accordance with the data signal inputted, the judgment processing is effected by the data processing apparatus 105 so as to output into the servo-motor the data signal for controlling the amount of pulsed rotational movement of the servo-motor of the auger filling machine 4. The on-off control for driving the stopping the servo-motor is effected by the control signal from the program control apparatus 101.

EXPERIMENT EXAMPLE

Experiments were carried out using a control system of the present invention for effecting the feedback controlling operation during the initial mode, the steady mode, and the final mode, using a system where the servo-motor was driven by constant pulses without feedback control being effected, and using a system where the feedback control was effected with n=1 and n=5 through all the feeding operations, i.e. without the division into the different operation modes, from starting time until stopping time.

In the these experiments, the number of filling operations was 700, the target filling amount was 100 mg, and the inferior reference was set to ±7%.

Figure 12:
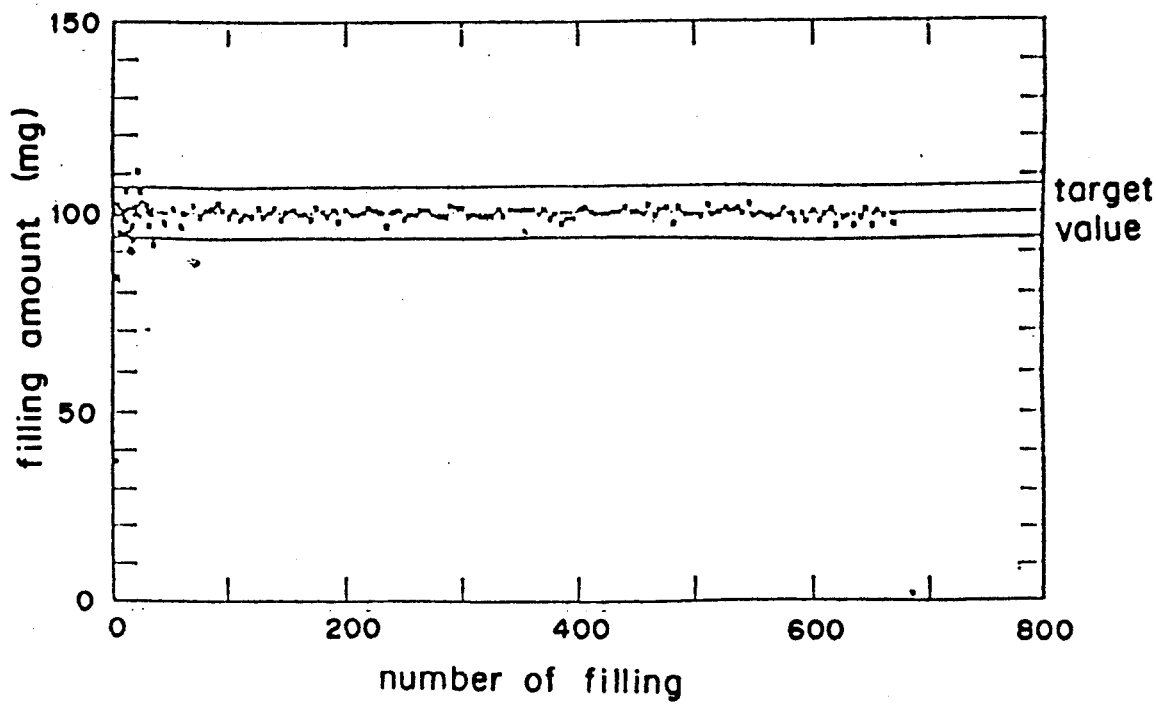
FIG. 12 is a chart for an operation where the filling amount of the filling machine is feedback-controlled.
Figure 13:
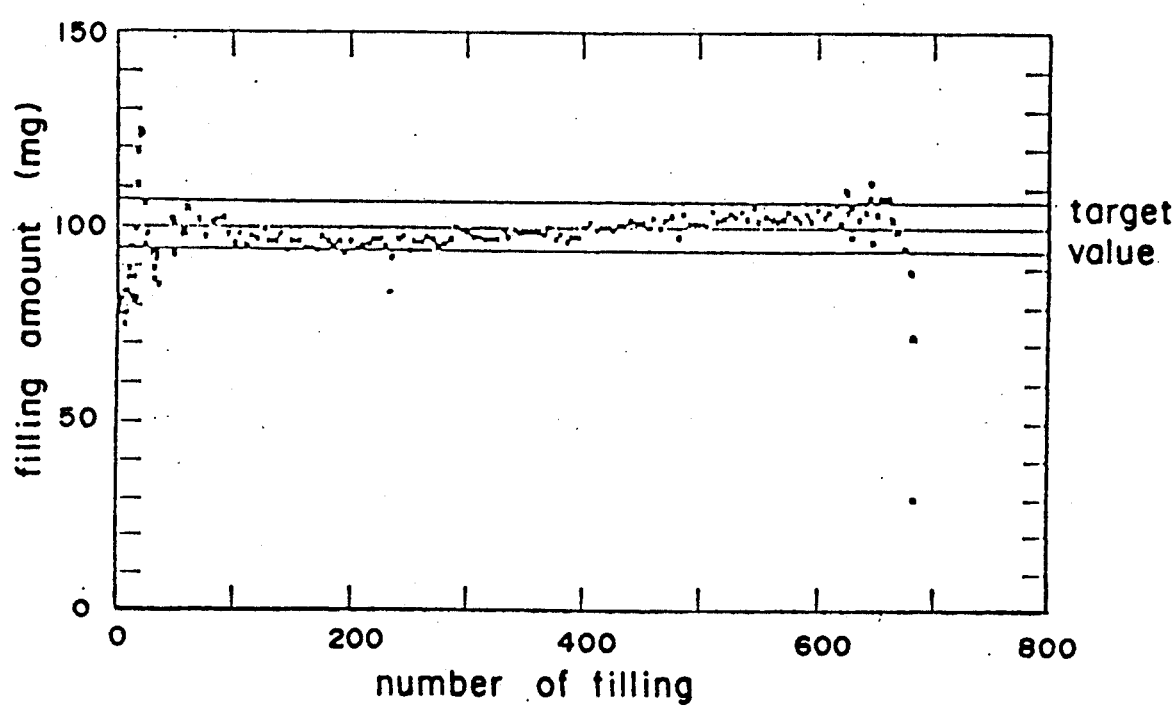
FIG. 13 is a chart for an operation where the filling amount is not feedback-controlled.

The results of these experiments are shown in Table 4 and FIGS. 12 and 13. When the feedback controlling operation of the present invention was used, the result was as shown in the graph of FIG. 12. Without the feedback control, the result was as shown in the graph of FIG. 13.

TABLE 4

| | no control constant pulse | control exists feedback n = 1 | control exists feedback n = 5 | control exists feedback n = 1, n = 5, n = 1 (present invention |
|---|---|---|---|---|
| CV | 4.5% | 2.5% | 1.7% | 1.5% |
| number of defective products | 62 | 11 | 25 | 8 |

In the present invention, the feedback control of the servo-motor for the auger in accordance with all of the weighing operation was effected, and also the feedback controlling method was changed depending on the initial, steady or final operation modes, so that a feedback controlling operation suitable for each mode was effected. Thus, the filling accuracy can be increased through the whole operation and also the defective products whose filling amount is out of the control range can be prevented from being produced to the greatest degree.

In the present invention, a processing apparatus 106 for emergency stopping of the auger filling machine is provided within the control apparatus 100. When powder is clogged between the inner wall of the cylindrical casing 21a of the measuring portion of the auger filling machine 4 and the auger 24, or the rotation of the auger 24 becomes gradually more difficult because of clogging of the screen 25 on the lower end opening of the measuring portion, the emergency stop processing apparatus 106 effects emergency stops of the auger 24 and all the driving mechanisms used for the filling apparatus 200 shown in FIG. 1.

Namely, as described above, the auger filling machine 4 fills a constant amount of powder 22 into a vial container 1 disposed therebelow through the screen 25 by rotation through a given angle of the rotary shaft 40 by the servo-motor of the driving apparatus 23 to rotate the auger 25 during the powder filling operation. After filling the constant amount of powder 22 into one container 1, rotation of the rotary shaft 40 and the auger 24 is stopped until the next container is transported into the filling position and is fixed, and then the intermittent auger rotation and stopping are repeated.

Figure 14:
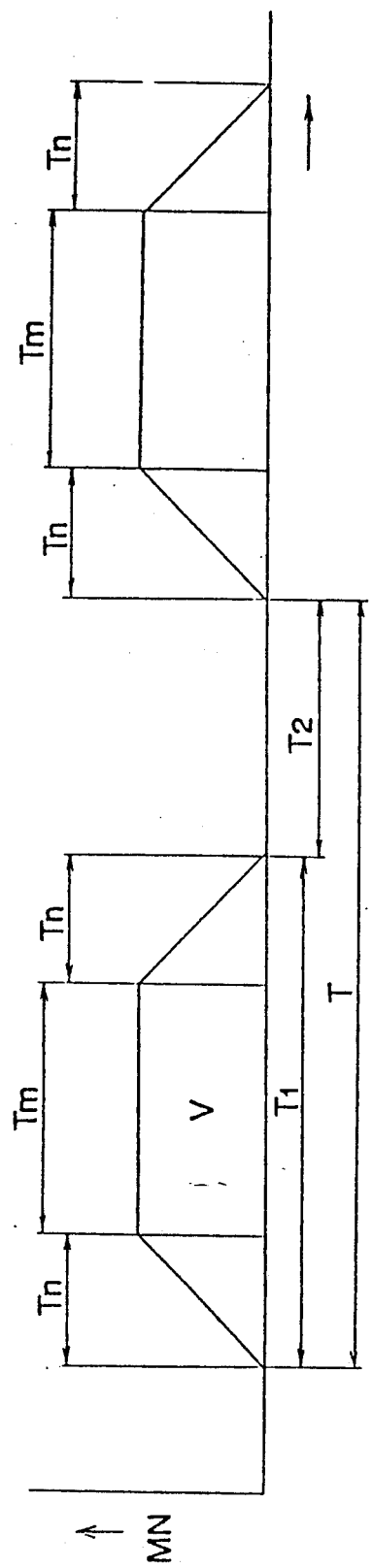
FIG. 14 is a diagram showing a rotation track of a servo-motor for rotatably driving the auger of the filling machine.

The operation conditions of the servo-motor of the driving apparatus 23 are determined by the values set for the rotary speed (MN), adjustable speed time (Tn), amount of rotational movement (V), and rotation time (T). In the present filling machine, the relationship between the rotation speed and the time is as shown by the track of FIG. 14.

In the drawing, the rotation time T is composed of the rotation time $T_1$ of the servo-motor for filling a constant amount of powder into one vial and a rotation stop time $T_2$ from completion of filling until the start of filling the next container:

$$(T = T_1 + T_2)$$

During rotation time $T_1$, the time Tn in the initial acceleration period and the final deceleration period is the same, and the rotation speed is adapted to increase to and decrease decrease from the steady rotation speed. The time Tm of the constant rotation speed between acceleration and deceleration is also made constant, so that the rotation speed during rotation time $T_1$ is controlled to be along a definite track as shown.

The servo-motor operated to achieve the operation conditions as described above is operated according to a correct track such as the track shown in FIG. 14 at the shown relationship between the time and the rotation speed, while the rotary shaft 40 and the auger 24 normally operate in the auger filling machine without abnormality. However, if the powder 22 is clogged in the gap between the auger casing 21a and the auger 24, or the screen 26 disposed in the lower end opening of the measuring portion is clogged, so an overtorque must be supplied to the rotation of the auger 24, the track shown in FIG. 14 changes in shape. When something goes wrong with the auger filling machine, the operation of the servo-motor does not follow the track as shown in FIG. 14 correctly. By detection of an abnormality of the track, abnormality of the auger filling machine is quickly detected, so that the auger 24 can be stopped before the auger 24 or the screen 25 is damaged.

In the present invention, when an abnormality such as powder clogging occurs in the auger filling machine 4, the abnormality is detected because the servo-motor does not stop even after the passage of the rotation time.

Figure 15:
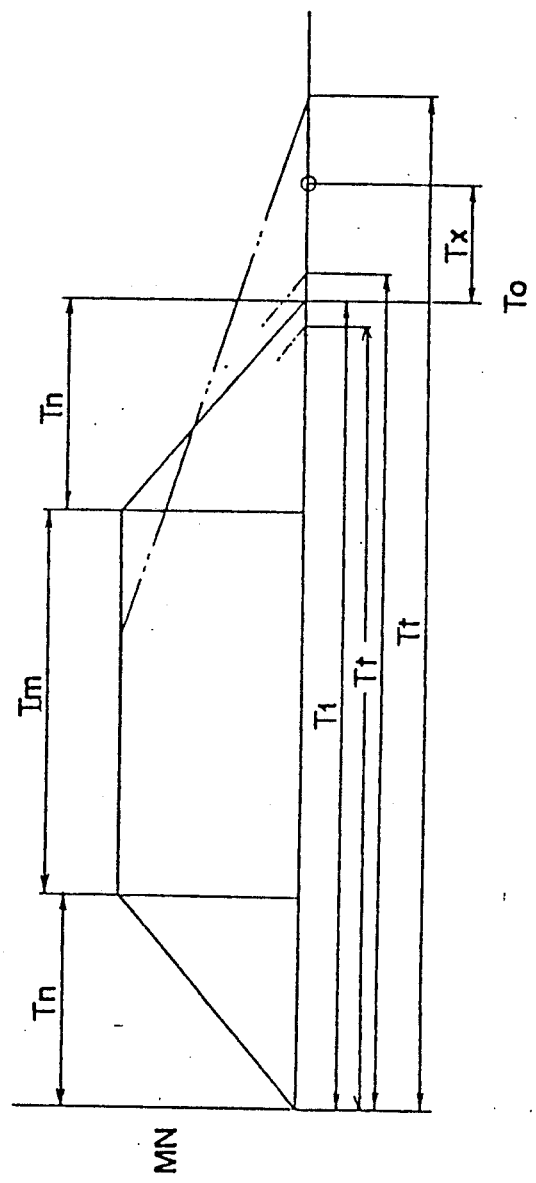
FIG. 15 is a portion of the diagram shown in FIG. 14, on an enlarged scale, for describing the principle of an abnormality in the detection time.

However, even when nothing goes wrong in the auger filling machine during actual rotation, some deviations and time measurement errors may occur as shown by the one-dot chain lines of FIG. 15 during rotation, so that the desired total rotation time $T_1$ is different from the actual total rotation time Tt (start signal - actual stop), causing a shift between the theoretical operation and the actual operation. When the shift is a certain value or lower, it is merely due to the variation during the stopping of rotation, but when the shift has reached a certain value or higher as shown by the two-dot chain line in FIG. 15, it is due to overtorque caused by powder clogging. Thus, when the shift between the total theoretical rotation time and the actual total rotation time exceeds constant value (abnormality detecting time) Tx, the servo-motor is adapted to come to a stop. The abnormality detecting time Tx must not exceed the rotation stop time $T_2$ from the theoretical stop time $T_0$ to the start of the rotation of the next period, and must be $Tx < T_2$.

In order to bring about an emergency stop of the servo-motor, the detection signal from the servo-motor rotation detecting means (not shown) is inputted into the emergency stop processing apparatus 106 of the control apparatus 100 shown in FIG. 7 to judge whether or not the shift between the theoretical total rotation time and the actual rotation time exceeds the constant value Tx. When the shift exceeds Tx, a signal for an emergency stop is adapted to output into the program control apparatus 101.

The processing apparatus which detects from the rotation of the servo-motor if the abnormality detecting time Tx exceeds the value Tx is adapted to output the servo-motor stop signal into the program control apparatus 101 when the output signal is on at a Tx lapse time point, for a rotation speed of 10% or more of the maximum rotation speed, using an output signal, for example. Or the processing means is adapted to output a servo-motor stop signal as an abnormality caused when the signal is on at the Tx lapse time point of the abnormality time by the use of a signal (positioning completion signal) to be outputted when the waiting pulse of the deviation counter has become a set value or lower.

Upon receiving the emergency stop signal, the program control apparatus 101 outputs a stop signal to the driving apparatus 23 for the servo-motor and simultaneously outputs a stop signal to all of the other driving means of the filling apparatus 200 shown in FIG. 1.

As described above, the servo-motor is used as a driving means for the auger 24 and also an emergency stop means is provided. The rotation of the auger may be automatically stopped when overtorque is applied to the auger 24 due to clogging of the powder 22 between the auger 24 and the auger casing 21a or the screen 25 is clogged, etc., or the rotation continues if the servo-motor rotates for the given theoretical rotation time $T_1$ and stops before passage of the abnormality detecting time Tx.

Although the present invention has been fully described by way of example with reference to the accompanying drawings, it is to be noted here that various changes and modification will be apparent to those skilled in the art. Therefore, unless such changes and modifications depart from the scope of the present invention, they should be construed as included therein.

What is claimed is:

1. A filling apparatus for filling containers, comprising:
 a delivery station to which empty containers are fed by a supply conveyor;
 a first electronic balance for weighing empty containers sequentially transported thereto by from said delivery station;
 a filling machine for filling a material into the containers transported thereto from said first electronic balance;

a second electronic balance for weighing filled containers transported thereto from said filling machine;

a further delivery station to which filled containers which have been weighed by said second electronic balance are transported for being taken out by a take-out means;

a container transportation means having an operation member having at least four container grasping chucks thereon for grasping a container therein for being transported by said transportation means; and operation member drive means for driving said operation member to move said at least four chucks into positions to simultaneously grasp a container in each of the respective delivery station, first electronic balance, filling machine and second electronic balance, and thereafter by movement of said operation member, simultaneously transfer an empty container from said delivery station to said first electronic balance, an empty container from said first electronic balance to said filling machine, a filled container from said filling machine to said second electronic balance, and a weighed filled container from said second electronic balance to said further delivery station.

2. A filling apparatus as claimed in claim 1 further comprising a defective product rejecting means at said further delivery station to which the weighed filled containers are delivered by said operation member, and means connected between said electronic balances and said defective product rejecting means for operating said defective product rejecting means to reject a container which has not been filled with the correct amount of material, said defective product rejecting means further being operable for delivering unrejected containers to a take-out means.

3. A filling apparatus as claimed in claim 1 in which said delivery station, said first electronic balance, said filling machine, said second electronic balance and said further delivery station are disposed in a line at substantially equal intervals, and said operation member is a bar and said at least four chucks are spaced along said bar at said intervals.

4. A filling apparatus as claimed in claim 3 in which said operation member drive means comprises means for moving said bar in an X-direction parallel to said line, a Y-direction toward and away from said line, and a Z-direction perpendicular to said Y-direction, whereby said at least four chucks can be moved from a start position toward the line and then transversely to the line and along the line to be positioned for gripping a container, then moved away from and along the line and then back toward the line for transferring the containers, and then away from the line and transversely to the line back to the start position.

5. A filling apparatus as claimed in claim 1 in which said electronic balances each have a weighing plate and a metallic cap for covering a container positioned on said weighing plate, said cap being movable upwardly away from said weighing plate to clear said weighing plate to receive a container, and movable downwardly onto said weighing plate to cover a container on said weighing plate, and means for moving said cap upwardly and downwardly.

6. A filling apparatus as claimed in claim 1 in which said electronic balances include means for outputting an electric signal representative of a weight with a weight sensitivity of no greater than 0.1 mg, and for outputting a signal at intervals of no greater than 0.2 seconds.

7. An filling apparatus as claimed in any one of claims 1, 5 and 6 further comprising a data processing apparatus for receiving and sampling weight data from said first and second electronic balances, for comparing the difference between the maximum value and the minimum value of the sampled data with a predetermined stable defective judging value and outputting the weight value when the difference is no greater than a stable detection judgement width.

8. A filling apparatus as claimed in claim 1 further comprising a data processing apparatus including calculating means for calculating the net amount of material filled into a container from the weight value of an empty container as measured by said first electronic balance and the weight value of a filled container as measured by said second electronic balance, feedback control signal means for providing a feedback control based on said net amount, a target amount to be filled into a container and the amount said filling machine is driven during a filling operation, and means for supplying feedback control to said filling machine based on the net amount for an immediately preceding filling operation for each filling operation during the initial operating period of said filling apparatus and the final operation period of said filling apparatus, and for supplying feedback control to said filling machine based on an average of the net amounts for a plurality of preceding filling operations for each filling operation during the steady operating period between the initial operating period and the final operating period.

9. A filling apparatus as claimed in claim 1 in which said filling machine has a casing having a funnel and a cylindrical auger casing on the lower end thereof, an auger in said cylindrical auger casing, a drive shaft on which said auger is mounted, and auger driving means for driving said auger for dispensing a powdered material from said casing.

10. A filling apparatus as claimed in claim 9 in which said auger driving means comprises a servo motor, and said apparatus further comprises an emergency stop means having a detecting means coupled to said servo motor for detecting whether an abnormal time has elapsed from the end of a theoretical rotation time of said servo motor required for a given amount of powder to be filled into a container, and a control circuit connected to said detection means and said servo motor for stopping rotation of said servo motor when said detection means detects the elapse of an abnormal amount of time.

11. A filling apparatus as claimed in claim 2 in which said defective product rejecting means comprises a star wheel rotatable in one direction and having concave portions at intervals on the outer periphery for receiving containers, a delivery position along the periphery of said star wheel at which containers can be delivered to a take-out conveyor, a shutter means at said delivery position to block passage of a container out of said star wheel when said shutter is in a closed position, a defective product passage positioned along said star wheel at a position past said delivery position in the direction of rotation of said star wheel, and said means for operating said defective product rejecting means causes said shutter to be closed when an improperly filled container is detected, whereby the improperly filled container is blocked from the take-out conveyor and is caused to be directed into said defective product passage.

* * * * *